(12) United States Patent
Knight et al.

(10) Patent No.: US 11,087,380 B2
(45) Date of Patent: Aug. 10, 2021

(54) METHOD, ARTICLE OF MANUFACTURE, AND SYSTEM FOR PROVISIONING AVAILABLE APPOINTMENTS

(71) Applicant: AMERICAN EXPRESS TRAVEL RELATED SERVICES COMPANY, INC., New York, NY (US)

(72) Inventors: Lisa M. Knight, Linden, NJ (US); Scott Seese, Cornelius, NC (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 1121 days.

(21) Appl. No.: 15/334,554

(22) Filed: Oct. 26, 2016

(65) Prior Publication Data
US 2018/0114195 A1  Apr. 26, 2018

Related U.S. Application Data

(63) Continuation of application No. 15/334,490, filed on Oct. 26, 2016, now abandoned.

(51) Int. Cl.
| | | |
|---|---|---|
| *G06Q 30/00* | (2012.01) | |
| *G06Q 30/06* | (2012.01) | |
| *G06Q 10/08* | (2012.01) | |
| *G06Q 10/10* | (2012.01) | |
| *H04L 29/08* | (2006.01) | |

(52) U.S. Cl.
CPC ....... *G06Q 30/0633* (2013.01); *G06Q 10/087* (2013.01); *G06Q 10/1095* (2013.01); *H04L 67/18* (2013.01); *H04L 67/306* (2013.01)

(58) Field of Classification Search
CPC ............. G06Q 30/0633; G06Q 10/087; G06Q 10/1095
USPC ........................................................ 705/26.8
See application file for complete search history.

(56) References Cited

U.S. PATENT DOCUMENTS

| 7,870,022 | B2 | 1/2011 | Bous |
| 7,933,810 | B2 | 4/2011 | Morgenstern |
| 8,070,056 | B2 | 12/2011 | Feldman et al. |
| 8,244,566 | B1 * | 8/2012 | Coley ................. G06Q 10/109 |
| | | | 705/7.11 |

(Continued)

OTHER PUBLICATIONS

System and Method to Identify Optimal Appointment Time, Jul. 27, 2012, The IP.com Prior Art Database (Year: 2012).*

(Continued)

*Primary Examiner* — Jeffrey A. Smith
*Assistant Examiner* — Timothy J Kang
(74) *Attorney, Agent, or Firm* — Thomas | Horstemeyer, LLP

(57) ABSTRACT

The system instantly provisions high demand items to a consumer. The system may be capable of identifying an item for a consumer based on information about the consumer and a demand associated with the item. The system may also be capable of reserving a reservation for the item. The system may further be capable of provisioning the item to the consumer based on a demand associated with the item. In this regard, the item may be instantly available to the consumer. The system may also be capable of adjusting an item inventory in the item inventory database. The system may further provide available appointments to consumers for selection in real-time.

20 Claims, 5 Drawing Sheets

(56) References Cited

U.S. PATENT DOCUMENTS

| | | |
|---|---|---|
| 8,489,452 B1 | 7/2013 | Warner et al. |
| 8,621,215 B1 | 12/2013 | Iyer |
| 8,725,635 B2 | 5/2014 | Klein |
| 8,874,674 B2 | 10/2014 | Allison |
| 9,443,262 B1 | 9/2016 | Mamgain |
| 2003/0028518 A1 | 2/2003 | Mankoff |
| 2004/0024665 A1* | 2/2004 | Foster ............ G06Q 40/12 705/31 |
| 2005/0071230 A1 | 3/2005 | Mankoff |
| 2006/0095434 A1 | 5/2006 | McCullough |
| 2006/0258397 A1 | 11/2006 | Kaplan |
| 2007/0250705 A1 | 10/2007 | Smith |
| 2008/0088480 A1* | 4/2008 | Rozum ......... G08G 1/096716 340/933 |
| 2008/0270251 A1 | 10/2008 | Coelho |
| 2009/0248543 A1 | 10/2009 | Nihalani |
| 2009/0313109 A1 | 12/2009 | Bous |
| 2010/0241559 A1 | 9/2010 | O'Connor |
| 2010/0324990 A1 | 12/2010 | D'Angelo |
| 2011/0029364 A1 | 2/2011 | Roeding |
| 2011/0131203 A1* | 6/2011 | Bodin ............ G06F 16/9537 707/724 |
| 2011/0270617 A1 | 11/2011 | Pacheco |
| 2011/0295749 A1 | 12/2011 | Scalisi |
| 2012/0030048 A1 | 2/2012 | Manley |
| 2012/0035965 A1 | 2/2012 | Maguire |
| 2012/0035985 A1 | 2/2012 | Maquire |
| 2012/0046958 A1 | 2/2012 | Pynadath |
| 2012/0150700 A1 | 6/2012 | Babar |
| 2012/0150740 A1 | 6/2012 | Isaacson |
| 2012/0209672 A1 | 8/2012 | Winner |
| 2012/0309413 A1* | 12/2012 | Grosman ............ G01S 5/02 455/456.1 |
| 2013/0073568 A1 | 3/2013 | Federov |
| 2013/0218653 A1 | 8/2013 | Rooke |
| 2013/0227636 A1 | 8/2013 | Bettini |
| 2013/0297448 A1 | 11/2013 | Lester |
| 2013/0304923 A1 | 11/2013 | Clay |
| 2013/0325946 A1 | 12/2013 | Allison, Jr. |
| 2014/0046748 A1 | 2/2014 | Nagarajan |
| 2014/0081782 A1 | 3/2014 | Morris et al. |
| 2014/0278679 A1* | 9/2014 | Navani ......... G06Q 10/063116 705/7.19 |
| 2015/0073925 A1 | 3/2015 | Renfroe |
| 2015/0100433 A1 | 4/2015 | Choy |
| 2016/0021152 A1 | 1/2016 | Maguire |
| 2016/0036479 A1 | 2/2016 | Lin |
| 2016/0364790 A1 | 12/2016 | Lanpher |
| 2017/0186060 A1 | 6/2017 | Morris |

OTHER PUBLICATIONS

Final Office Action dated Oct. 19, 2018 in U.S. Appl. No. 15/334,490.
Office Action dated Feb. 1, 2017 in U.S. Appl. No. 15/334,490.
Final Office Action dated Mar. 22, 2017 in U.S. Appl. No. 15/334,490.
USPTO; Non-Final Office Action dated Sep. 7, 2018 in U.S. Appl. No. 15/456,777.
Notice of Allowance dated Feb. 16, 2017 in U.S. Appl. No. 13/889,307.
USPTO; Advisory Action dated Mar. 21, 2018 in U.S. Appl. No. 15/334,490.
Canadian Examination Search Report dated Jan. 31, 2018 in Canadian Application No. 2,849,271.
USPTO; Non-Final Action dated Mar. 9, 2018 in U.S. Appl. No. 13/794,301.
USPTO; Advisory Action dated Mar. 22, 2018 in U.S. Appl. No. 13/715,423.
USPTO; Non-Final Office Action dated Apr. 5, 2018 in U.S. Appl. No. 15/216,264.
USPTO; Final Office Action dated Apr. 6, 2018 in U.S. Appl. No. 13/468,880.
USPTO; Final Office Action dated Apr. 25, 2018 in U.S. Appl. No. 15/195,781.
USPTO; Advisory Action dated Apr. 26, 2018 in U.S. Appl. No. 15/626,598.
Advisory Action dated Oct. 20, 2016 in U.S. Appl. No. 13/889,307.
Final Office Action dated Aug. 30, 2016 in U.S. Appl. No. 13/889,307.
Office Action dated Jan. 20, 2016 in U.S. Appl. No. 13/889,307.
Office Action dated Jun. 25, 2015 in U.S. Appl. No. 13/889,307.
Advisory Action dated Apr. 17, 2015 in U.S. Appl. No. 13/889,307.
Final Office Action dated Jan. 28, 2105 in U.S. Appl. No. 13/889,307.
Office Action dated Jul. 3, 2014 in U.S. Appl. No. 13/889,307.
Advisory Action dated Apr. 18, 2014 in U.S. Appl. No. 13/889,307.
Final Office Action dated Jan. 29, 2014 in U.S. Appl. No. 13/889,307.
Office Action dated Sep. 23, 2013 in U.S. Appl. No. 13/889,307.
USPTO, Final Office Action dated Feb. 8, 2018 in U.S. Appl. No. 15/334,490.
USPTO, Non-Final Office Action dated May 1, 2018 in U.S. Appl. No. 15/334,490.
Non-Final Office Action dated Aug. 31, 2017 in U.S. Appl. No. 15/334,490.
Advisory Action dated Jul. 11, 2017 in U.S. Appl. No. 15/334,490.
Non-Office Action dated Jul. 29, 2019 in U.S. Appl. No. 16/188,873.

* cited by examiner

500

```
┌─────────────────────────────────────┐
│ RECEIVING, BY A COMPUTER-BASED      │
│ SYSTEM AND VIA A MERCHANT PORTAL IN │
│ REAL-TIME, AVAILABLE APPOINTMENTS   │
│ FROM A MERCHANT                     │
│ 510                                 │
└─────────────────────────────────────┘
                  │
                  ▼
┌─────────────────────────────────────┐
│ DETERMINING, BY THE COMPUTER-BASED  │
│ SYSTEM AND IN RESPONSE TO THE       │
│ RECEIVING, A SUBSET OF CONSUMERS    │
│ THAT QUALIFY FOR THE AVAILABLE      │
│ APPOINTMENTS, BASED ON RULES        │
│ 515                                 │
└─────────────────────────────────────┘
                  │
                  ▼
┌─────────────────────────────────────┐
│ ASSOCIATING, BY THE COMPUTER-BASED  │
│ SYSTEM AND IN RESPONSE TO THE       │
│ DETERMINING, THE AVAILABLE          │
│ APPOINTMENTS WITH THE SUBSET OF     │
│ CONSUMERS BASED ON THE RULES        │
│ 520                                 │
└─────────────────────────────────────┘
                  │
                  ▼
┌─────────────────────────────────────┐
│ SENDING, BY THE COMPUTER-BASED      │
│ SYSTEM AND IN RESPONSE TO THE       │
│ ASSOCIATING AND IN REAL-TIME,       │
│ NOTIFICATIONS TO THE SUBSET OF      │
│ CONSUMERS ABOUT THE AVAILABLE       │
│ APPOINTMENTS; AND                   │
│ 525                                 │
└─────────────────────────────────────┘
                  │
                  ▼
┌─────────────────────────────────────┐
│ RECEIVING, BY THE COMPUTER-BASED    │
│ SYSTEM, A SELECTION OF A REQUEST TO │
│ RESERVE ONE OR MORE OF THE AVAILABLE│
│ APPOINTMENTS                        │
│ 530                                 │
└─────────────────────────────────────┘
```

FIG. 5

METHOD, ARTICLE OF MANUFACTURE, AND SYSTEM FOR PROVISIONING AVAILABLE APPOINTMENTS

CROSS REFERENCE TO RELATED APPLICATIONS

This application is a continuation of, claims priority to and the benefit of, U.S. patent application Ser. No. 15/334,490 filed on Oct. 26, 2016 and entitled "SYSTEM AND METHOD FOR PROVISIONING ITEMS." which is incorporated herein by reference in its entirety.

FIELD

The present disclosure generally relates to provisioning items, and more specifically, to creating a marketplace of buyers and sellers by providing opportunities to obtain available items and/or providing items to selected users based on user preferences and requests that trump third party demands for the items.

BACKGROUND

Traditional service channels limit user access to items (e.g., goods or services). These channels typically require users to consume services based on the market demand and availability. In this regard, users are required to "wait in line" to receive high demand items. Moreover, merchants often have unused item capacity. If consumers were aware of the opportunities to obtain the unused capacity, merchants could better allocate the unused capacity. As such, there is a need to provision items instantly and without regard for demand.

SUMMARY

The systems, methods and computer program products (collectively "systems") provide a mechanism to instantly provision high demand items to a consumer. The system may be configured to perform operations and/or steps including syncing a consumer profile with the item provisioning engine. The system may further be capable of identifying, by a consumer monitoring module of a computer based system, an item for a consumer based on information about the consumer and a demand associated with the item. The system may also be capable of reserving, by the computer based system and with an item inventory database, a reservation for the item. The system may further be capable of provisioning, by the computer based system via the item provisioning engine, the item to the consumer based on a demand associated with the item. In this regard, the item may be instantly available to the consumer. The system may also be capable of adjusting, by the computer based system, an item inventory in the item inventory database.

In various embodiments, the demand may be associated with the item such that demand for the item exceeds the supply of the item. The demand may be determined based on an input from an item provider portal. Demand may also be determined by a transaction account issuer based on a number of transactions associated with the item.

In various embodiments, a reservation may be created in the item inventory database based on an input from an item provider. The input from the item provider may be provided via the item provider portal. The reservation for the item may be a guarantee from the item provider that the item is available. The provisioning the item may include creating a reservation with the item provider. The provisioning of the item may be conducted in real-time. In this regard, real-time may be substantially simultaneous with and/or in response to receiving a request for the item from a consumer device.

In various embodiments, a notification of the provisioning may be provided to a plurality of devices associated with the consumer. A notification of the provisioning may also be associated with a social media profile of the consumer and/or a social media profile of a third party. In this regard, a status associated with the social media profile may be updated to display the item. In various embodiments, the item may be associated with the consumer. The associating may be confirmed to the consumer by a notification to the consumer device. The syncing may be in response to a consumer opting in to an item provisioning program or receiving consumer information from an item provider via an item provider portal. The item may be a good or a service.

The system may also include a method comprising receiving, by a computer-based system and via a merchant portal in real-time, available appointments from a merchant; determining, by the computer-based system and in response to the receiving, a subset of consumers that qualify for the available appointments, based on rules; associating, by the computer-based system and in response to the determining, the available appointments with the subset of consumers based on the rules; sending, by the computer-based system and in response to the associating and in real-time, notifications to the subset of consumers about the available appointments; and receiving, by the computer-based system, a selection of a request to reserve one or more of the available appointments.

The method may further comprise transmitting, by the computer-based system, the selection to the merchant. In response to the receiving the selection of the request, the available appointment associated with the selection may be locked out. The system may also, in response to the receiving the selection of the request, notify other consumers that the available appointment is no longer available. The system may also, in response to the receiving the selection of the request, notify other consumers about at least one of other appointments that are still available, other locations that have availability, other merchants that have availability or a different discount for accepting a different appointment. The computer-based system may be operated by a financial services company.

The receiving the available appointments may also occur at least one of periodically, on a set schedule, during a time period, during a season, outside of a season, based on an algorithm, or using a trigger. The receiving may be a result of at least one of the merchant posting the available appointments in the merchant portal, the merchant portal accessing a merchant appointment system, or a data feed existing between the merchant portal and the merchant system. The available appointment may be at least one of an existing appointment, partially available, a changed availability, the availability obtained at any time, part of a backlog, a result of a cancellation or pending inventory.

The merchant may cancel an appointment for a lower level consumer holding the appointment. The rules include at least one of consumer geo-location, consumer location relative to the merchant, consumer spending history, a consumer calendar, a consumer profile, consumer preferences, or consumer social media information. The rules may also include consumer geo-location, wherein the consumer geo-location is based on at least one of consumer smart phone, consumer travel itinerary, consumer check-in at a location, global positioning systems, consumer transactions at a location, proximity to a merchant, consumer tracking websites, or consumer tracking systems.

The notifications may be sent via at least one of smart phone, social media, cellular phone, text or email. The notifications may include the request to reserve the appointment, wherein the request is accomplished by at least one of calling the merchant, sending a text to the merchant, selecting a URL in the notification, accessing a merchant website, selecting a software-enabled button in the notification, or auto-accepting the appointments based on rules.

The system may also charge at least one of the merchant, the consumer or a third party for participating in the method. The system may further require the consumer to obtain a transaction account in order for the consumer to at least one of receiving the notifications or provide the selection. The system may also require the merchant to accept a transaction account in order for the merchant to at least one of send available appointments or receive the selection.

BRIEF DESCRIPTION OF THE DRAWINGS

The features and advantages of the present disclosure will become more apparent from the detailed description set forth below when taken in conjunction with the drawings.

FIG. 5 illustrates process for creating a marketplace of buyers and sellers, in accordance with various embodiments.

DETAILED DESCRIPTION

Figure 1:
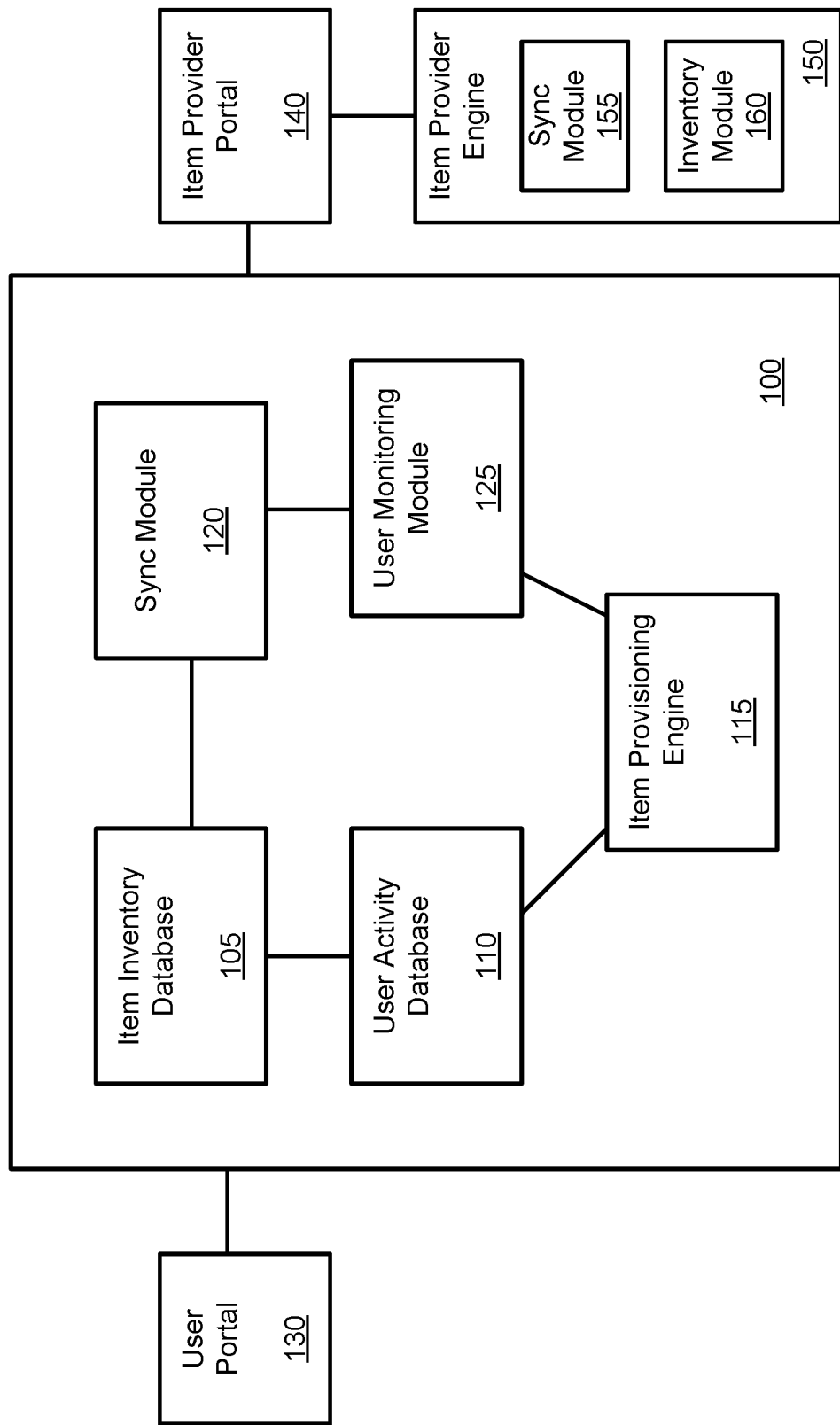
FIG. 1 is a system diagram showing various elements of an item provisioning system, in accordance with various embodiments.

In general, the system provides a consumer with the ability to access high demand items, with reduced wait or without having to wait for the item or gain access to the item in a traditional way. For example, a person with a certain transaction account may be offered concert tickets to a concert, prior to the general public receiving an offer to purchase tickets to the concert. A consumer walking by a restaurant that has a long wait time for a table may receive a notification that, because of the consumer's status, the consumer may be able to obtain a table at the restaurant with little or no wait. A person may be offered a new Apple iPhone or a new model of car before the products are available to others. A person may be offered access to a speaker, a debate, a new restaurant or a new nightclub before others are given access.

The system also facilitates purchases in digital channels. The system further facilitates monitoring and rewarding activities or accomplishments in a digital channel. The system further facilitates confirmation or verification of activities in digital channels based on transaction information.

The system may also offer an individual the ability (and/or requirement) to obtain a transaction account, in order to take advantage of the enhanced access to the high demand items. For example, a person may be offered a chance to obtain the concert tickets prior to others, but only if the person registers for a certain transaction account. More information about acquiring transaction account owners can be found in U.S. Ser. No. 14/465,674 filed Aug. 12, 2014 and entitled "System and Method For Transaction Account Owner Acquisition," which is incorporated herein by reference in its entirety.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As e-commerce and digital activities grow and the boundaries of the virtual marketplace and virtual world disappear, consumers are looking for ways to more easily access high demand items. At the same time, merchants, payment processors, and other similarly situated entities are also looking for new ways to attract consumers. In this regard, merchants are also looking to target specific kinds of consumers who want access to high demand items, without having to obtain the items through traditional channels that would otherwise require the consumers to wait for the items. Moreover, the instant access to high demand items may be a fee based service, a status based service, a reward for loyalty and/or a reward for past activity (with a merchant, payment processor, and/or other suitable entity).

In various embodiments, and with reference to FIG. 1, an item provisioning system 100 may comprise an item inventory database 105, a consumer activity database 110, an item provisioning engine 115, a sync module 120, a consumer monitoring module 125, and/or the like. Each of the various databases, modules and/or engines may operatively communicate and be in an electronic communication, such that each of the various engines, modules and/or databases may share information to any other database, module, or engine. Item provisioning system 100 may be configured to manage and/or provision (e.g., in real-time) inventory of an item and/or the item to a particular consumer. In this regard, item provisioning system 100 may be configured to manage and/or track inventory of items from various item providers. Item provisioning system 100 may also be configured to sync consumers to the system and/or track consumers' activity information to tailor item provisioning to the consumer based on the consumers' activity information.

In various embodiments, item provisioning system 100 may be accessible by an item provider through an item provider portal 140. Item provider portal 140 may be accessible by an item provider engine 150 operated by an item provider. Item provider engine 150 may comprise a sync module 155, an inventory module 160, and/or the like. Item provisioning system 100 may also be accessible by a consumer via a consumer portal 130.

In various embodiments, and in operation, the system may be capable of syncing or associating a consumer with an instant provisioning system. The information to sync the profile and the instant provisioning system may be captured by an item provider (e.g., a merchant), a payment processor, and/or by a third party service. The information to sync may be provided by a consumer through a consumer portal. In response to the transaction account and the profile being synced, the system may track consumer spending, consumer interactions, consumer geographic locations, consumer social media activities, and/or any other suitable consumer activities. The system may be capable offering high demand items to a consumer via an electronic offer or other suitable item delivery mechanism. The system may also be capable of creating a reservation for an item with an item provider. For additional features and functions related to creating a reservation, see U.S. Ser. No. 13/889,307 filed May 7, 2013 and entitled "SYSTEM AND METHOD FOR CREATING RESERVATIONS," which is incorporated herein by reference in its entirety.

Figure 2:
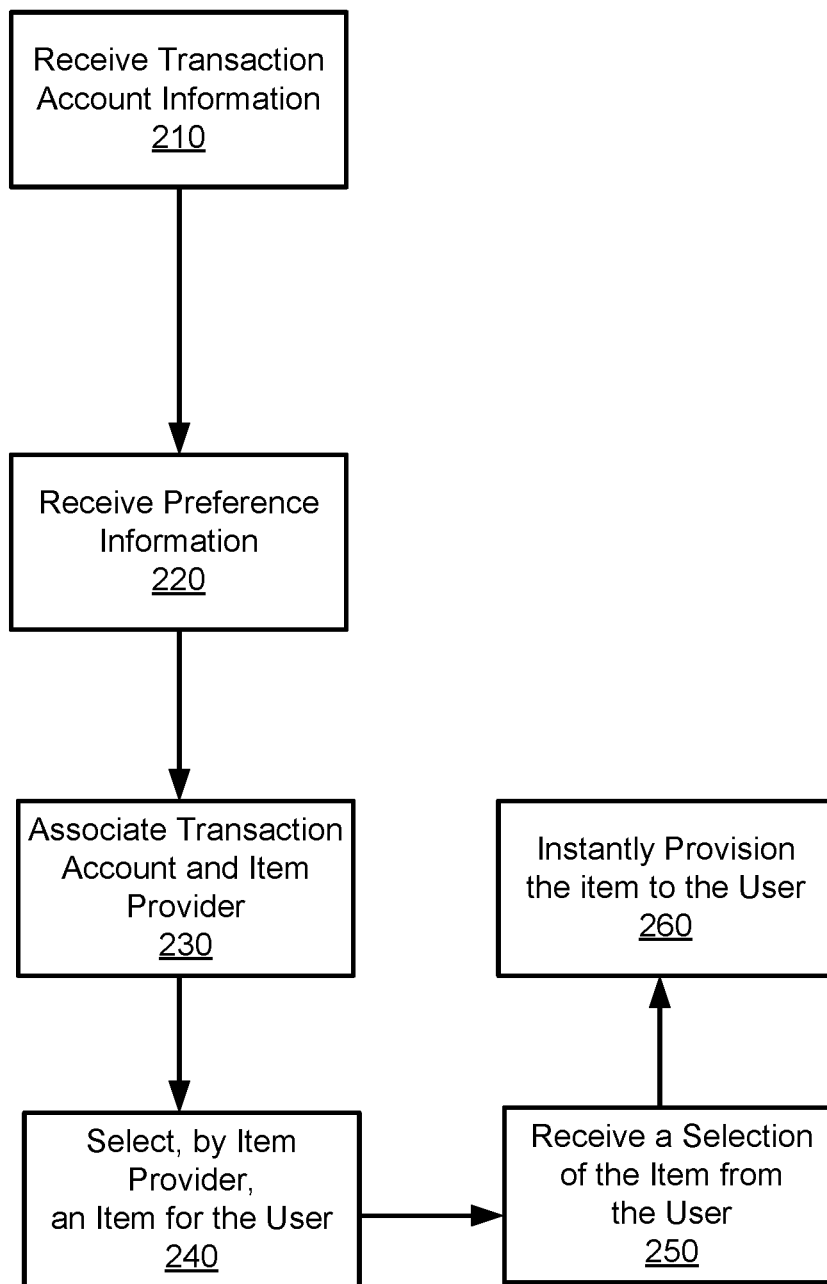
FIG. 2 illustrates a sync process, in accordance with various embodiments.

In various embodiments, and with reference to FIG. 1 and FIG. 2, a consumer and/or an item provider may be configured to or may be capable of syncing with item provisioning system 100 via sync module 120, and/or the like. Item provisioning system 100 may be capable of associating or syncing a transaction account and/or consumer profile with item provisioning system 100 and/or an item provider via sync module 120 and/or sync module 155.

Item provisioning system 100 may be configured to perform method 200. Method 200 may cause item provisioning system 100 to receive transaction account information (Step 210). The transaction account information may be requested by or provided to item provisioning system 100 through any suitable channel including, for example, sync module 120 and/or sync module 155. For example, item provisioning system 100 may be associated with a payment processor (e.g., transaction account issuer). In this example, sync module 120 may request the transaction account information through a channel provided by the transaction account issuer (e.g., a transaction account issuer website or mobile application). The transaction account information may also be captured through sync module 155 at an item provider or by a third party, or by item provisioning system 100. The transaction account information may be captured through a Tillable form, through an API or other suitable channel interface. Thus, information desired to sync a transaction account with item provisioning system 100 may be captured in a digital channel, by the transaction account issuer, or by a third party.

Item provisioning system 100 may also be capable of receiving consumer profile information for the channel (Step 220). As noted above with respect to the transaction account information, the consumer profile information for the channel may be requested by or provided to item provisioning system 100 through any suitable channel including, for example user (e.g., consumer) portal 130, sync module 120, sync module 155, and/or the like. The consumer profile information may also be provided in conjunction with or at substantially the same time as the transaction account information. For example, where the transaction account information is provided to item provisioning system 100, the consumer profile and preference information may also be sent with the captured transaction account information. More specifically, the system capturing the data may request that the consumer be logged into or otherwise known to the digital channel in response to providing the transaction account information, such that the digital channel can automatically provide the consumer profile information with the transaction account information. In operation, in response to a consumer syncing transaction account and consumer profile information through a digital channel, the digital channel may capture the transaction information in the channel through a form or other suitable data capture mechanism. The form may be provided securely by the channel provider or a third party. The transaction data and consumer profile data are sent to the transaction account issuer, such that the transaction account and the consumer profile can be synced.

Item provisioning system 100 may request, obtain or otherwise determine channel profile information to associate the transaction account with an item provider (Step 230). Item provisioning system 100 may be capable of communicating this association back to the item provider or any other suitable channel provider (e.g., a synced social media channel). Based on the association, the item provider, a channel provider, and/or a third party partner may be capable of monitoring the activities (e.g., accomplishments, spending, locations, trends, interests, and/or the like) of the consumer. The channel provider may be further capable of communicating these activities to item provisioning system 100. Item provisioning system 100 may allow the consumer to define various preferences related to the activities with a channel, purchasing, shipment, rewards, offers, and/or the like. For example, item provisioning system 100 may allow the consumer to select whether to enter confirmation information associated with the transaction account and/or consumer profile for the channel, in response to selecting an item in a digital channel. The system may also either request that confirmation is provided for each item or transaction and/or provide that each transaction is partially or fully completed automatically. Where transactions are completed automatically, item provisioning system 100 may receive confirmation information associated with the transaction account and/or consumer profile for the channel in response to the consumer defining her initial preferences.

Item provisioning system 100 may also provide an indicator or data associated with the transaction account to the channel provider. The channel provider may identify the consumer profile associated with the channel. Based on this identification, the channel provider may monitor or otherwise track and/or report the activities of the consumer in the channel to item provisioning system 100.

As noted above, item provisioning system 100 may also allow a consumer to partially or fully define other preferences. For example, item provisioning system 100 may allow a consumer to define one or more shipping addresses to facilitate fulfillment of a transaction or purchase. Item provisioning system 100 may also allow a consumer to define how offers and/or rewards are earned, distributed, provided, and the like for transactions and/or purchase events. For additional information on how offers and/or rewards are earned, distributed, and/or provided, see for example, U.S. patent application Ser. No. 13/439,768, filed, Apr. 4, 2012, and entitled System and Method for Providing International Coupon-Less Discounts, U.S. Provisional Patent Application Ser. No. 61/710,461 filed on Mar. 14, 2012 and entitled "GENERATING MERCHANT RECOMMENDATIONS FOR CONSUMERS" and U.S. Provisional Patent Application Ser. No. 61/646,778 filed on May 14, 2012 and entitled "SYSTEMS AND METHODS FOR TAILORED MARKETING BASED ON FILTERING," each of which is incorporated by reference in its entirety for all purposes.

As part of preference selection, item provisioning system 100 may provide a consumer with the option to associate multiple channels with a single transaction account or multiple transaction accounts with one or more channels. If a consumer has several digital channels and/or social media profiles (e.g., Facebook, Foursquare, Twitter, LinkedIn, and/or the like), item provisioning system 100 may provide a consumer with the option to select multiple channels to sync with item provisioning system 100. Item provisioning system 100 may present the consumer with selectable links that trigger a sync or association between the channel and the transaction account. Item provisioning system 100 may also request information for each of the digital channels and/or social media profiles. This central linking capability creates a convenient and efficient solution for the consumer to link her transaction account(s) with multiple channels through a single interface.

Method 200 may further include item provider selecting an item for the consumer (Step 240). The selection may be based on the preferences or activities associated with the consumer or one of the various accounts or channels associated with the consumer. The item provider may present the selected item to the consumer in any suitable form, such as, for example, an electronic selectable offer, a push notification, and/or the like. Item provisioning system 100 may be configured to receive a selection of the item form the consumer (Step 250). In this regard, the medium that the item is presented in may be monitored by user monitoring module 125. The selection may be conveyed to the item provider and item provider engine 150 via item provider portal 140. The inventory for the item and an association of the item may be in response to the selection and as discussed in more detail herein. Item provisioning engine 115 may instantly provision the item to the consumer (Step 260). In this regard, the item may be made available and/or reserved to the consumer, for use by the consumer at the consumer's discretion.

Figure 3:
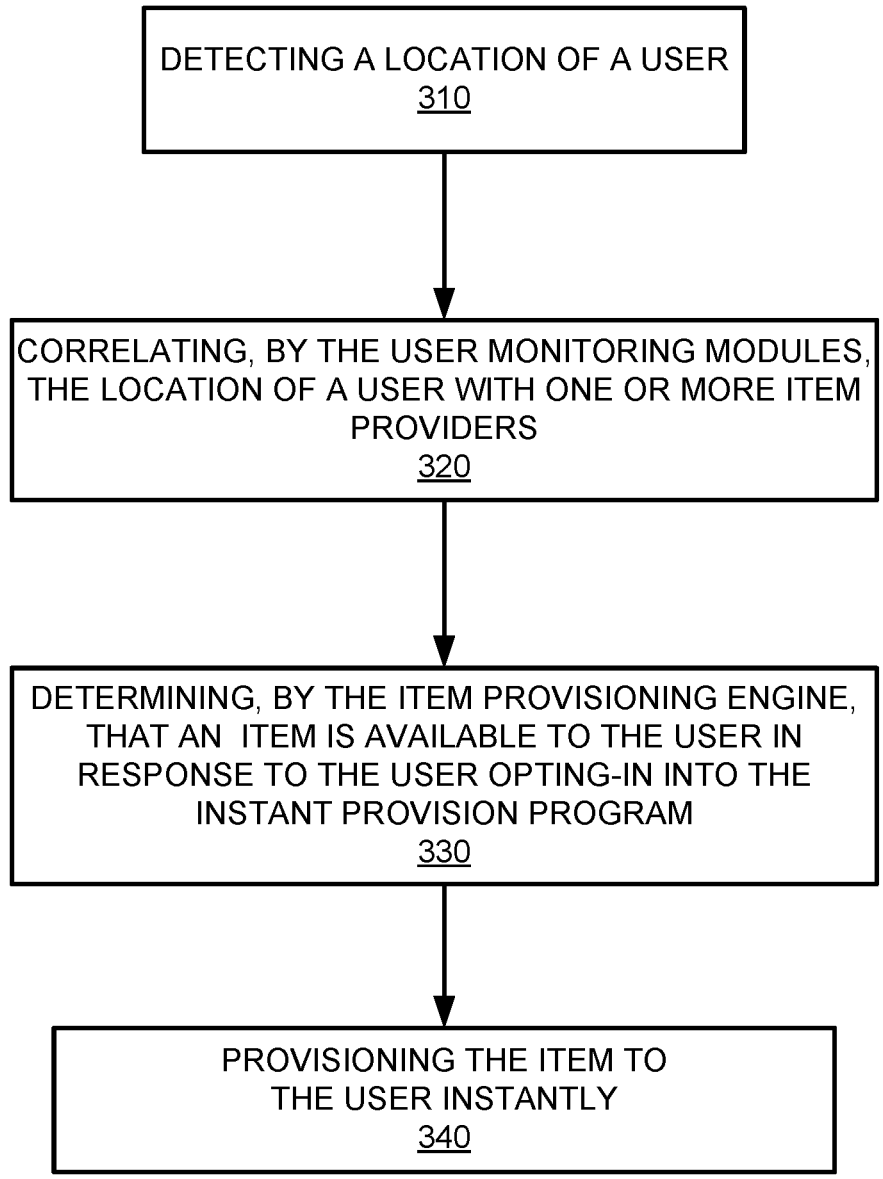
FIG. 3 illustrates a first item provisioning process, in accordance with various embodiments.

In various embodiments, and with reference to FIG. 1 and FIG. 3, item provisioning system 100 may be configured to carry out a method 300. Method 300 may comprise steps or operations including detecting a consumer location (Step 310). In this regard, user monitoring module 125 of item provisioning system 100 may be configured to monitor consumer activities and/or item or devices associated with the consumer. For example, a consumer may sync one or more devices, profiles, and/or accounts with item provisioning system 100 via sync module 120 and through user portal 130 as described herein. More specifically, a consumer may sync a mobile device and a transaction account with item provisioning system 100. User monitoring module 125 may be configured to monitor the location of the mobile device synced by the consumer in order to determine an approximate location of the consumer. User monitoring module 125 may also be configured to monitor authorizations associated with the consumer transaction account to determine an approximate location of a consumer based on a consumer spend activities with the transaction account.

Method 300 may further comprise correlating, by user monitoring module 125, the location of a consumer with one or more item providers (Step 320). User monitoring module 125 may be configured to access item inventory database 105 to identify particular items offered by item providers. The item and/or item provider may include location information to correlate or approximate the location of the item relative to the consumer, so that the item may be offered to the consumer for provisioning should the consumer select the item.

In various embodiments, method 300 may further comprise determining, by the item provisioning engine 115, that an item is available to the consumer in response to the consumer opting into the instant provisioning program (Step 330). In this regard, item provisioning engine 115 and/or user monitoring module 125 may identify an item available in item inventory database 105 from an item provider. This item may be offered to consumers synced with item provisioning system 100. Moreover, these items may be instantly available to the consumer based on the consumer selecting the offer, selecting a button associated with the offer, liking the offer in a channel associated with the consumer, and/or taking any other suitable activity associated with the offer of the item to acknowledge and confirm that the consumer wishes to purchase and/or consume the item.

Method 300 may further comprise provisioning the item to the consumer in real-time or instantly (step 340). Item provisioning engine 115 may be configured to (e.g., simultaneously to a consumer accepting an offer and/or in response to a consumer accepting an offer) provision the item from item inventory database 105 to the consumer. This provisioning may include an association, a reservation, and/or a link between the consumer, an account associated with the consumer, and the consumer device, and/or the like.

Figure 4:
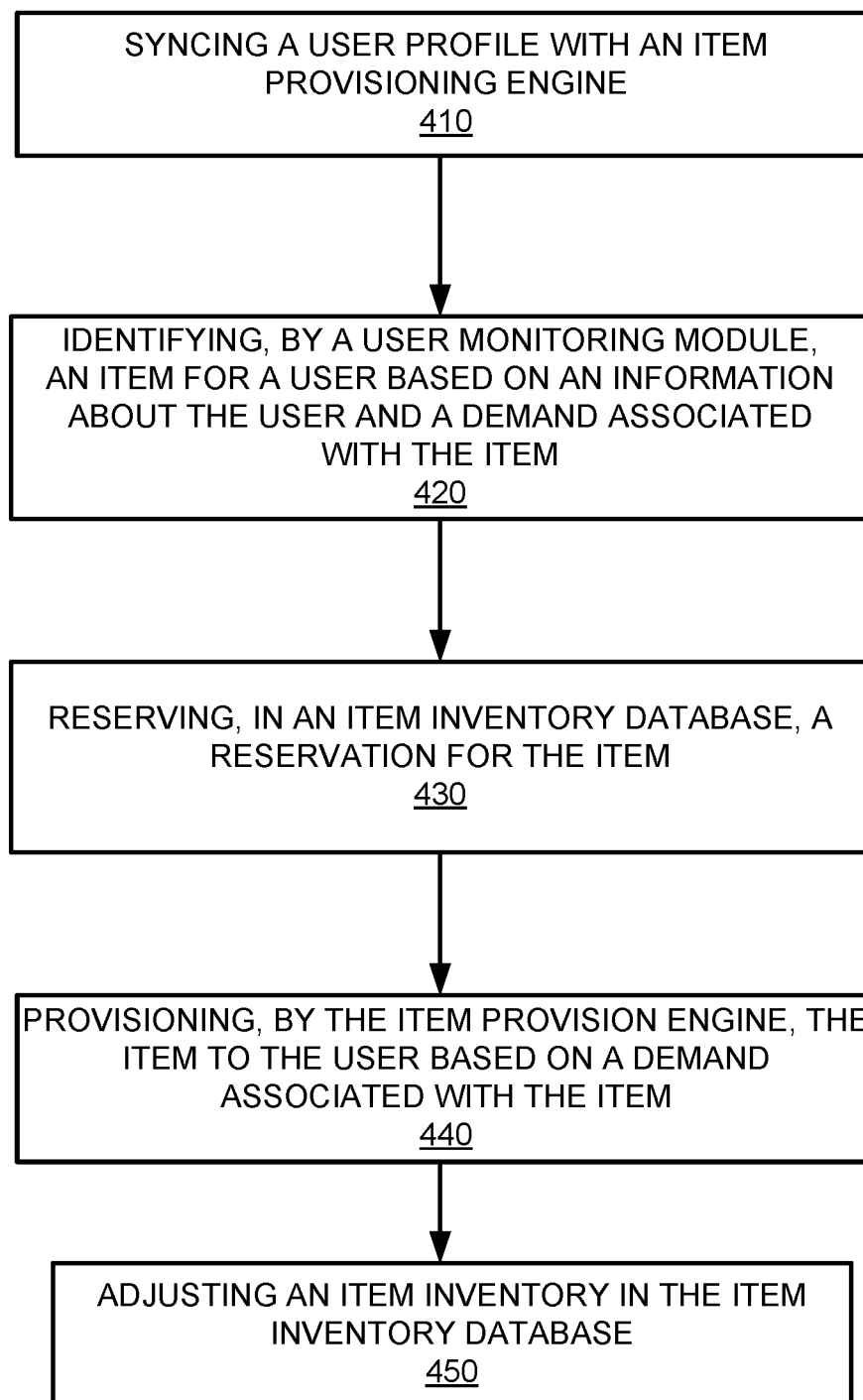
FIG. 4 illustrates a second item provisioning process, in accordance with various embodiments.

In various embodiments, and with reference to FIG. 1 and FIG. 4, item provisioning system 100 may be configured to perform method 400. Method 400 may include steps and/or comprise operations including syncing a consumer profile with item provisioning engine 115 (Step 410). The consumer profile may be synced with item provisioning engine 115 in any suitable fashion as described herein. Method 400 may further comprise identifying by user monitoring module 125 an item for a consumer based on information about the consumer and a demand associated with the item (Step 420). Information about the consumer may be determined by real time monitoring of the consumer with user monitoring module 125 and/or activity information that is historical and stored by a consumer in user activity database 110.

In various embodiments, the demand associated with the item may be any suitable indication of consumption of the item. For example, the demand associated with the item may be a demand for the item that exceeds the supply of the item. The demand may include rare items or items in very limited supply. This demand may be determined based on location information associated with the item and/or the consumer, inventory information associated with the item and the geographic region associated with the consumer, and/or any other suitable information associated with either the item or the consumer that can be analyzed to determine the availability of the item versus the consumption of the item by the general public or a subset of people. Moreover, the demand associated with the item may be determined based on an input from the item provider via the item provider portal. In this regard, the item provider may monitor inventory of an item via inventory module 160. In response to the inventory of the item reaching an appropriate level, the item provider may provide a demand to item provisioning system 100 via item provider portal 140. The demand may also be determined by a transaction account issuer based on a number of transactions associated with the item. In this regard, the transaction account issuer may adjust demand information associated with the item based on an increase or decrease in transactions associated with the item.

In various embodiments, method 400 may further comprise reserving, in an item inventory database 105, a reservation for the item (Step 430). The reservation may be created in item inventory database 105 based on an input from an item provider, a consumer, a transaction account issuer, and/or the like. In response to the reservation being created in item inventory database 105, reservation data may cause a similar reservation be created by item provider engine 150 in inventory module 160. The reservation data may be created based on and/or in response to indication that the item has been reserved by a consumer from item provisioning system 100 via item provider portal 140. The reservation for the item may be a guarantee from the item provider that the item is available.

Method 400 may further comprise provisioning, by item provisioning engine 115, the item to the consumer based on the demand associated with the item (Step 440). The provisioning may also occur in response to or based on an input from the consumer and/or an interaction between the consumer and an offer of the item to a consumer. Moreover, the provisioning of the item may be and/or may create a reservation with the item provider, and a reservation of the item in item inventory database 105. The reservation with the item provider may be communicated by item provisioning system 100 via item provider portal 140 to item provider engine 150 and/or inventory module 160. The provisioning of the item may be conducted at any time such as, for example, in real time, in batch, substantially simultaneously the interaction between the consumer and the offer of the item and/or in response to the interaction between the consumer and the offer of the item. More specifically, the real time interaction may be substantially simultaneous with and/or in response to receiving a request for the item from a consumer device. The request for the item from the consumer device may be conducted through user portal 130 and/or may be communicated directly to item provisioning engine 115 and/or sync module 120.

Method 400 may further comprise adjusting an item inventory in at least one of item inventory database 105 and/or inventory module 160 (Step 450). The adjusting may also trigger adjustments of profiles associated with the consumer via sync module 120. For example, a notification associated with a consumer social media profile may be provided. In this regard, the status of the consumers' social media profile may be adjusted to reflect that the consumer has a reservation for or has been provisioned with an item. In this way, item provisioning system 100 may be configured to provide the consumer with the item. Item provisioning system 100 may also be configured to alert others that the consumer has been associated with and/or provided the item. In this way, item provisioning system 100 may be configured to link the status associated with the item with the status of the consumer.

In various embodiments, provisioning system 100 may include the creation of a marketplace for buyers and/or sellers. Merchants may provide provisioning system 100 with available items such as, for example, available service times, available appointments, available inventory, opportunities, and/or the like. Merchants that often have available items or available appointments include, for example, fitness trainers, hair salons, masseuse, restaurants, movie theaters, ticket vendors, bike rentals, car rentals, etc. The consumer is often unaware that a merchant appointment is available, and the merchant must often spend large amounts of money advertising to many consumers (most of which are uninterested), in order to find a consumer that may be interested in the availability. Instead of a merchant waiting for a consumer to fill an empty appointment, provisioning system 100 notifies consumers about the specific available times. Such a system helps a merchant be at or closer to full capacity (e.g., a full calendar of appointments). The opportunities may be real-time opportunities to obtain a reservation with a merchant that helps a merchant increase its capacity.

Method 500 is set forth in FIG. 5. As set forth in FIG. 5, in various embodiments, the merchant may provide such available items to a merchant portal associated with provisioning system 100 (Step 510). The merchant may provide the merchant portal with available items in real-time, periodically, on a set schedule, during a time period, during or outside of a season (e.g., not during Christmas time), based on an algorithm, using a trigger (e.g., when over 3 appointments are available in one day, when two consecutive appointments are available, when revenue drops below $x over a period of time, when an appointment is still available within 10 hours of the appointment, etc) and/or the like. For example, a fitness trainer may often have open appointment times during the work day (e.g., 10 am, 2 pm, etc). Such open appointment times may be provided by the merchant to the merchant portal. The merchant portal may include various APIs to help facilitate the exchange of data. The merchant portal may be part of, or interface with, a mobile platform to help provide notices (as set forth below) to smartphones, social media, etc. Posting items to the portal may include the merchant posting such available times in the merchant portal, the merchant portal accessing the merchant appointment system (e.g., via merchant website, merchant social media site, etc), a data feed existing between the systems or any other system and method for data to be provided to or acquired by the merchant portal. The available items do not necessarily need to be fully or partially "available"; rather, a merchant may post any items wherein an appointment already exists (or a potential appointment exists), but the merchant may be willing to "bump" the consumer holding the reservation if a higher status consumer requests the reservation. Furthermore, the available items may be partially available (e.g., consumer wants 5 tickets, but only 2 are available) or the availability may have been changed (e.g., merchant received a return of tickets or a cancellation). Moreover, the available items do not necessarily need to be in "inventory"; rather, the items can be obtained at any time, a backlog created, inventory created from cancellations of appointments or orders and/or pending inventory may exist or be available to the merchant.

In various embodiments, provisioning system 100 may associate the available appointments with a subset of consumers (Step 515) based on consumer geo-location, consumer spending history, consumer calendar, consumer profile, consumer preferences, consumer social media information and/or the like. As discussed above, the geo-location of the consumer may be determined via the consumer smart phone, consumer travel itinerary, consumer check-in at a location, global positioning systems, consumer transactions at a location, proximity to a merchant, consumer tracking websites, consumer tracking systems, etc. User monitoring module 125 of item provisioning system 100 may be configured to monitor consumer activities and/or items or devices associated with the consumer. For example, a consumer may sync one or more devices, profiles, and/or accounts with item provisioning system 100 via sync module 120 and through user portal 130 as described herein. More specifically, a consumer may sync a mobile device and a transaction account with item provisioning system 100. User monitoring module 125 may be configured to monitor the location of the mobile device synced by the consumer in order to determine an approximate location of the consumer. User monitoring module 125 may also be configured to monitor authorizations associated with the consumer transaction account to determine an approximate location of a consumer based on a consumer spend activities with the transaction account.

The system may further comprise correlating, by user monitoring module 125, the location of a consumer with one or more merchants. User monitoring module 125 may be configured to access item inventory database 105 to identify particular items (e.g., service, appointments, etc) offered by merchants. The item and/or merchant may include location information to correlate or approximate the location of the item relative to the consumer, so that the item may be offered to the consumer for provisioning should the consumer select the item. Provisioning system 100 may be operated by (or data obtain information from) a financial services company, so provisioning system 100 is able to obtain and/or analyze consumer transaction information.

In various embodiments, in response to determining the subset of consumers that may qualify for the available appointments, the system associates the available appointments with the subset of consumers based on the rules (Step 520). In various embodiments, provisioning system 100 may send out notifications to the subset of consumers about offers for the available items (Step 525). The notifications may be provided to the smart phone, social media, cellular phone, text, email, or any other device or method discussed herein. In various embodiments, the notice may include a request to "reserve" the appointment. The "reserve" selection which may be accomplished by any means including, for example, calling the merchant, sending a text to the merchant, selecting a URL in the notification, accessing the merchant website, selecting a software-enabled button in the notification, a consumer setting the system to auto-accept appointments based on certain rules, etc. Provisioning system 100 and/or the merchant system may receive the selection (Step 530). Provisioning system 100 may send the selection data to the merchant (e.g., if the merchant does not receive the selection data directly). In response to the appointment being reserved, the selected appointment may be locked out from other consumers accepting the appointment (e.g., by the provisioning system 100 and/or by the merchant). The other notified consumers may receive another notification that the appointment is no longer available, other appointments that may still be available, other locations that may have availability, other merchants that may have availability, a different discount (e.g., for accepting a different time), etc.

As an example of the above system, a personal trainer may input into the merchant portal that she has an open time for training at 2:30 pm today. Provisioning system 100 then analyzes consumer profiles to determine which consumers have a transaction history showing expenses on personal trainers. Provisioning system 100 also reviews consumer profiles to determine which of those consumers may prefer to work out in the mornings and provisioning system 100 eliminates those consumers from consideration. Provisioning system 100 determines which consumers prefer to work out in the afternoons and are currently within 5 miles of the personal training location. Provisioning system 100 accesses the personal calendars of such consumers to determine if the consumers may have business meetings at 2:30 pm. Provisioning system 100 sends a notification to the subset of consumers that like to work out in the afternoons, that are currently close to the personal training location and that do not have a business meeting at that time.

In various embodiments, provisioning system 100 may include the distribution of offers for the available items (e.g., reservations) to "upgrade" the spend associated with the reservation. The notice and/or distribution of the offers may be spontaneous. The creation of offers may be based on merchant rules, a consumer's location or a consumer's profile. For example, a restaurant may have reservations on a particular evening from "Level 1" consumers that often spend between $50-80 at the restaurant. However, the merchant may want to increase the status of the consumer or the spend of the consumer for certain reservations. As such, the merchant may provide certain characteristics to provisioning system 100 for offering a discount or incentive to a "Level 4" consumer. A "Level 4" consumer may hold a higher limit or higher status transaction account. The "Level 4" consumer may also have a transaction history that indicates higher spending at a certain restaurant (e.g., Morton's Steakhouse on Broadway and $5^{th}$), at a certain restaurant chain (e.g., any Morton's Steakhouse), at a type of restaurant (e.g., steak restaurants), an area (e.g., in NYC), during a certain time period (e.g., during Christmas time), during a certain event (e.g., on vacation, at a business conference, etc). The merchant may set a rule or requirement for a discount to be distributed to consumers that typically spend $120-200 at the particular restaurant during the current time period, wherein such consumers are within 5 miles of the restaurant at the time the discount is distributed to the consumer's smartphone during that same evening.

Provisioning system 100 may charge the merchant, the consumer and/or a third party in response to participating in the system (e.g., sending notices, receiving notices and/or selecting a reservation). Provisioning system 100 may also offer the consumer the ability (and/or requirement) to obtain a transaction account (or upgrade an account), in order to participate in the system. Provisioning system 100 may also require the consumer to meet a certain threshold to participate in the system (e.g., the consumer must have billed $10,000 on his transaction account the prior month). To participate in the system, provisioning system 100 may require the merchant to accept a certain transaction account for payment and/or to pay for the items. More information about acquiring transaction account owners can be found in U.S. Ser. No. 14/465,674 filed Aug. 12, 2014 and entitled "System and Method For Transaction Account Owner Acquisition," which is incorporated herein by reference in its entirety.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The phrases consumer, customer, user, account holder, account affiliate, cardmember and/or the like shall include any person, entity, business, government organization, business, software, hardware, machine associated with a transaction account, buys merchant offerings offered by one or more merchants using the account and/or is designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Terms and phrases similar to "sync," "syncing," and/or "synchronizing" may include associating, tagging, flagging, correlating, using a look-up table or any other method or system for indicating or creating a relationship between elements such as, for example (i) a transaction account and (ii) an item (e.g., offer, reward, discount) and/or digital channel. Moreover, the sync may occur at any point, in response to any suitable action, event, or period of time. The sync may occur at pre-determined intervals, periodic, randomly, once, more than once, or in response to a suitable request or action.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

As used herein, a "merchant" may be any person or entity capable of providing a service or an item. A merchant may distribute the item in any way, for example, by exchanging the item for payment. The merchant may be capable of accepting the payment through any suitable payment channel including traditional payment channels including, for example, POS terminals, online payments terminals, transaction account networks and the like. The merchant may also accept payment through non-traditional payment terminals including, for example, social media channels, person to person payments. Further information about person to person payments is described in U.S. patent application Ser. No. 13/640,216, entitled Systems and Methods for Transferring Value via a Social Network, which is herein incorporated by reference in its entirety for any purpose.

In various embodiments, the system and method may include alerting a participating consumer (e.g., subscriber) when their computer is offline. The system may include generating customized information and alerting a remote subscriber that the information (e.g., offer, discount, available item) can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information (e.g., offer, discount, and/or available item) of an underlying window to become automatically viewable to the consumer. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a consumer's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the consumer; and automatically returning the relocated scaled textual information, by the processor, to the first format within the first window when the overlap condition no longer exists.

In various embodiments, the system may also include isolating and removing malicious code from electronic messages (e.g., notifications) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions (e.g., using the offer, discount, and/or available item), using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

The disclosure and claims do not describe only a particular outcome of provisioning an item, but the disclosure and claims include specific rules for implementing the outcome of provisioning an item and that render information into a specific format that is then used and applied to create the desired results of provisioning an item, as set forth in *McRO, Inc. v. Bandai Namco Games America Inc.* (Fed. Cir. case number 15-1080, Sep. 13, 2016). In other words, the outcome of provisioning an item can be performed by many different types of rules and combinations of rules, and this disclosure includes various embodiments with specific rules. While the absence of complete preemption may not guarantee that a claim is eligible, the disclosure does not sufficiently preempt the field of provisioning an item at all. The disclosure acts to narrow, confine, and otherwise tie down the disclosure so as not to cover the general abstract idea of just provisioning an item. Significantly, other systems and methods exist for provisioning an item, so it would be inappropriate to assert that the claimed invention preempts the field or monopolizes the basic tools of provisioning an item. In other words, the disclosure will not prevent others from provisioning an item, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, a uniform resource locator ("URL"), a document (e.g., a Microsoft Word document, a Microsoft Excel document, an Adobe .pdf document, etc.), an "ebook," an "emagazine," an application or microapplication (as described below), an SMS or other type of text message, an email, Facebook, Twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/3000, Windows XP, Windows Vista, Windows 7, OS2, UNIX, Linux, Solaris, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMacs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows, OS2, UNIX, Linux, Solaris, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of item provisioning system 100 may be implemented as micro-applications or micro-apps. Micro-apps are typically deployed in the context of a mobile operating system, including for example, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a consumer, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the consumer are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the consumer. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a consumer's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to an "entity" may include any individual, consumer, customer, group, business, organization, government entity, transaction account issuer or processor (e.g., credit, charge, etc.), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
monitoring, by a computer-based system, a plurality of client devices to determine at least a respective geo-location of the plurality of client devices;
receiving, by the computer-based system and via a merchant portal in real-time, available appointments from a merchant;
determining, by the computer-based system and in response to the receiving, a subset of consumers that qualify for the available appointments, based on a plurality of rules, at least the respective geo-location of the plurality of client devices relative to a location of the merchant, and a personal calendar associated with a respective consumer being open for scheduling the available appointments;
associating, by the computer-based system and in response to the determining, the available appointments with the subset of consumers based on the rules;
sending, by the computer-based system and in response to the associating and in real-time, notifications to the plurality of client devices associated with the subset of consumers about the available appointments; and
receiving, by the computer-based system, a selection of a request to reserve one or more of the available appointments the selection corresponding to a selectable component included in the notifications.

2. The method of claim 1, further comprising transmitting, by the computer-based system, the selection to the merchant.

3. The method of claim 1, wherein the receiving the available appointments also occurs at least one of periodically, on a set schedule, during a time period, during a season, outside of a season, based on an algorithm, or using a trigger.

4. The method of claim 1, wherein the receiving is a result of at least one of the merchant posting the available appointments in the merchant portal, the merchant portal accessing a merchant appointment system, or a data feed existing between the merchant portal and the merchant appointment system.

5. The method of claim 1, wherein an available appointment of the available appointment is at least one of an existing appointment, a partially available appointment, a changed availability, an availability obtained at any time, part of a backlog, a result of a cancellation or pending inventory.

6. The method of claim 1, wherein the merchant cancels an appointment for a lower level consumer holding the appointment.

7. The method of claim 1, wherein the rules include at least one of a consumer geo-location, a consumer location relative to a merchant, a consumer spending history, a consumer calendar, a consumer profiles, a consumer preference, or a consumer social media information.

8. The method of claim 1, wherein the rules include a consumer geo-location, wherein the consumer geo-location is based on at least one of a customer smart phone, a consumer travel itinerary, a consumer check-in at a location, global positioning systems, consumer transactions at a location, a proximity to a merchant, consumer tracking websites, or consumer tracking systems.

9. The method of claim 1, wherein the computer-based system is operated by a financial services company.

10. The method of claim 1, wherein the notifications are sent via at least one of smart phone, social media, cellular phone, text or email.

11. The method of claim 1, wherein the selectable component, upon selection, facilitates the selection of the request to reserve an appointment of the available appointments.

12. The method of claim 1, wherein the request is accomplished by at least one of calling the merchant, sending a text to the merchant, selecting a URL in a received notification, accessing a merchant website, selecting a software-enabled button in the received notification, or auto-accepting an appointment of the available appointments based on the rules.

13. The method of claim 1, wherein, in response to the receiving the selection of the request, a particular available appointment of the available appointments associated with the selection is locked out.

14. The method of claim 1, further comprising, in response to the receiving the selection of the request, notifying, by the computer-based system, other consumers that a particular available appointment of the available appointments is no longer available.

15. The method of claim 1, further comprising, in response to the receiving the selection of the request, notifying, by the computer-based system, other consumers about at least one of other appointments that are still available, other locations that have availability, other merchants that have availability or a different discount for accepting a different appointment.

16. The method of claim 1, further comprising charging, by the computer-based system, at least one of the merchant, a consumer or a third party for participating in the method.

17. The method of claim 1, further comprising requiring, by the computer-based system, a consumer to obtain a transaction account in order for the consumer to at least one of receiving the notifications or provide the selection.

18. The method of claim 1, further comprising requiring, by the computer-based system, the merchant to accept a transaction account in order for the merchant to at least one of send available appointments or receive the selection.

19. An article of manufacture including a non-transitory, tangible computer readable storage medium having instructions stored thereon that, in response to execution by a computer-based system, cause the computer-based system to perform operations comprising:
monitoring, by a computer-based system, a plurality of client devices to determine at least a respective geo-location of the plurality of client devices;
receiving, by the computer-based system and via a merchant portal in real-time, available appointments from a merchant;
determining, by the computer-based system and in response to the receiving, a subset of consumers that qualify for the available appointments, based on a plurality of rules, at least the respective geo-location of the plurality of client devices relative to a location of the merchant, and a personal calendar associated with a respective consumer being open for scheduling the available appointments;

associating, by the computer-based system and in response to the determining, the available appointments with the subset of consumers based on the rules;

sending, by the computer-based system and in response to the associating, notifications to the plurality of client devices associated with the subset of consumers about the available appointments; and receiving, by the computer-based system, a selection of a request to reserve one or more of the available appointments the selection corresponding to a selectable component included in the notifications.

20. A system comprising:

a processor, a tangible, non-transitory memory configured to communicate with the processor, the tangible, non-transitory memory having instructions stored thereon that, in response to execution by the processor, cause the processor to perform operations comprising:

monitoring, by the processor, a plurality of client devices to determine at least a respective geo-location of the plurality of client devices;

receiving, by the processor and via a merchant portal in real-time, available appointments from a merchant;

determining, by the processor and in response to the receiving, a subset of consumers that qualify for the available appointments, based on a plurality of rules, at least the respective geo-location of the plurality of client devices relative to a location of the merchant, and a personal calendar associated with a respective consumer being open for scheduling the available appointments;

associating, by the processor and in response to the determining, the available appointments with the subset of consumers based on the rules;

sending, by the processor and in response to the associating, notifications to the plurality of client devices associated with the subset of consumers about the available appointments; and receiving, by the processor, a selection of a request to reserve one or more of the available appointments the selection corresponding to a selectable component included in the notifications.

\* \* \* \* \*